United States Patent Office 2,741,376
Patented Apr. 10, 1956

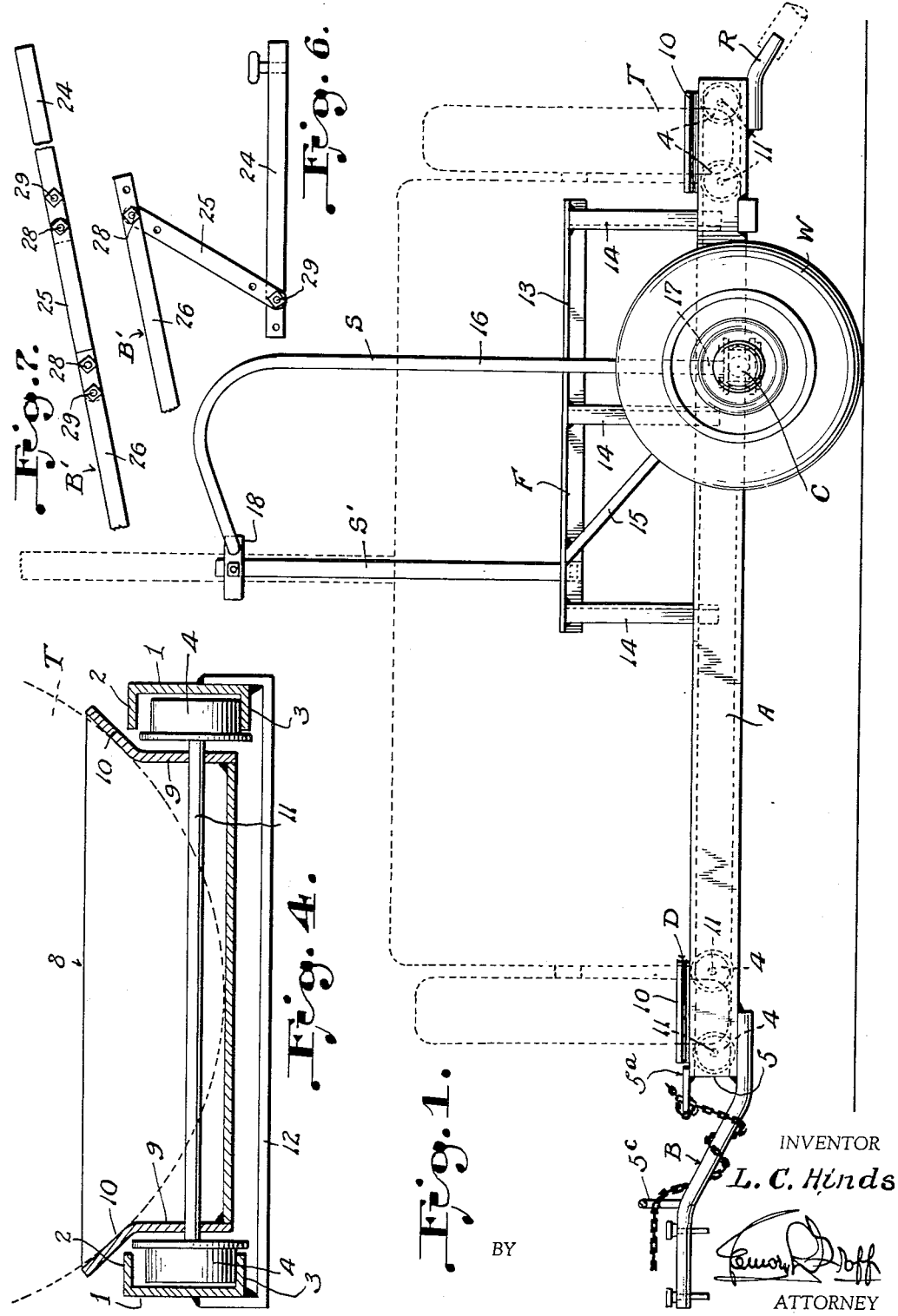

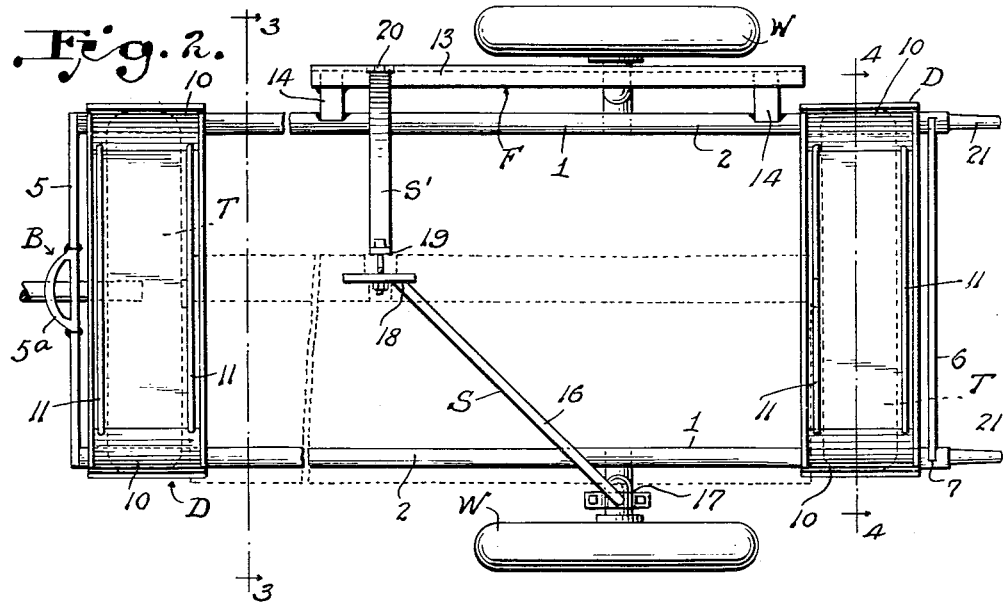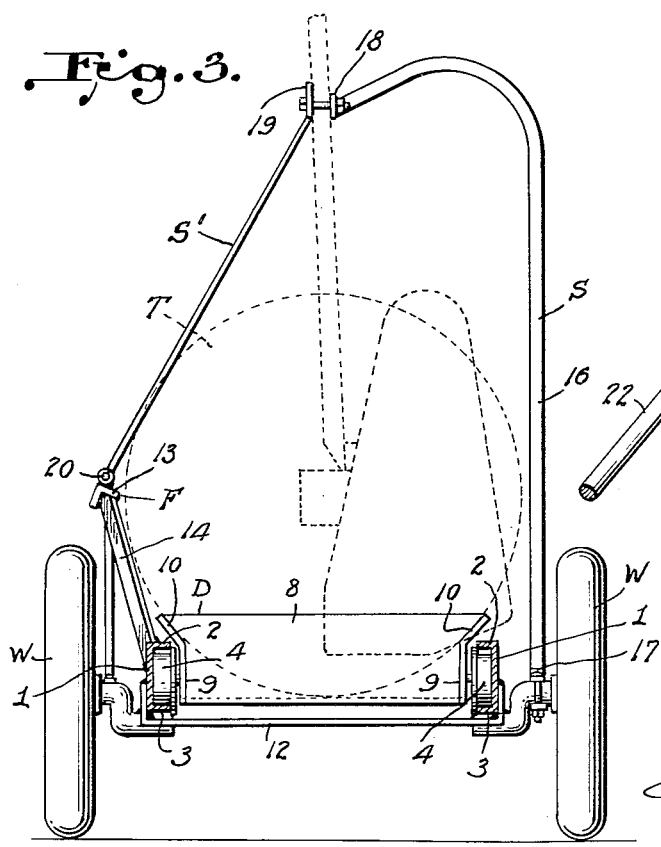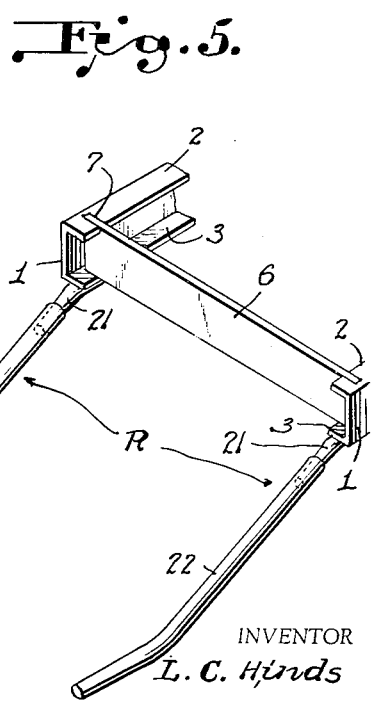

2,741,376

IMPLEMENT TRANSPORTING TRAILER

Leslie C. Hinds, Grand Junction, Colo.

Application April 26, 1954, Serial No. 425,460

5 Claims. (Cl. 214—83.24)

This invention relates to trailers, and more particularly to a vehicle for transporting mobile equipment whose width is greater than the width of the traveling lane of a roadway for vehicular traffic.

Many agricultural or earth working implements, or the like, must, at one time or another, be transported over a roadway, and because their relatively long axle dimension, including the tires, is wider than a traffic lane, they must be turned at an angle of substantially 90° to be towed along a highway and at the same time observe traffic regulations.

Accordingly, the present invention has primarily in view a trailer including a chassis or frame including side rails in the form of channels to slidably receive tire supporting elements mounted on flanged wheels intended to travel on the lower wall of a pair of channels of the frame in order to mount the implement on the trailer vehicle. These tire supporting elements are in the nature of cradles constituting separate mobile units and have the advantage that when the chassis or frame is tilted at its rear end toward the ground, the implement itself may be lifted and have one of its tires placed in one of the cradles and preliminarily moved into the channels. This operation may be repeated for the other tire of the implement so that the latter may be readily and conveniently fixed on to the chassis with a minimum expenditure of time and labor. When the cradles receiving the tires of the implement are in the channels, they are held therein by any suitable means such as a removable tail gate.

Another object of the invention is to provide means carried by the chassis for supporting and holding the tongue of the implement upwardly so that it may be moved with stability in transit and not project into the traffic lane.

A further object of the invention is to provide convenient ramp elements for guiding the flanged wheels of the tire receiving cradles into the channels when mounting the implement on the trailer, or conversely facilitating its removal at its destination.

With the above and other objects in view which will more readily appear as the nature of the invention is better understood, the same consists in the novel construction, combination, and arrangement of parts hereinafter more fully set forth and claimed.

A practical embodiment of the invention is shown in the accompanying drawings, in which:

Fig. 1 is a side elevation of the improved trailer with the implement to be transported shown in dotted lines.

Fig. 2 is a top plan view.

Fig. 3 is a vertical sectional view taken on the line 3—3 of Fig. 2.

Fig. 4 is a vertical sectional view taken on the line 4—4 of Fig. 2.

Fig. 5 is a detail perspective view illustrating the ramp means.

Fig. 6 is a detail view of a toggle type hitch in collapsed form which permits of the front end of the chassis tilting upwardly while connected to the towing vehicle to lower the rear end of the chassis.

Fig. 7 is a detail view of the hitch of Fig. 6 in rigid rectilinear form as when the trailer is being towed.

Similar reference characters designate corresponding parts in the several views.

Referring first to Fig. 1 it will be seen that the trailer vehicle includes a chassis designated generally as A having towing means B at its front end, suitable axle means C for mounting the traction wheels W, while the rear of the chassis or frame A is provided with the ramp means R, later to be described in detail. The chassis A is also provided with implement anchoring and stabilizing means designated generally as S and S'.

Within the chassis or frame A there is provided a plurality of shiftable units D which constitute in effect a so-called in-frame roller conveyor which receive the tires of the implement to be carried, and whose construction and operation will hereinafter more fully appear.

Referring more in detail to the chassis A it will be observed that the same includes a pair of parallel channel members 1 which form the side rails of the chassis. The channels 1 are provided with the top and bottom walls 2 and 3 which cooperate with the flanged wheels 4 of the elements D to provide tracks in which the cradles may travel.

Before proceeding further with the description of the mobile elements D it may be noted that the front end of the chassis A is provided with a permanent or fixed wall 5. The trailer hitch B is secured to the front end of the chassis below the permanent front wall 5. It may also be noted, as more clearly shown in Fig. 5, that the rear end of the channels 1 may be closed by a removable tail gate 6. This tail gate may be conveniently inserted and removed from suitable slots 7 in the top walls 2 of the channels 1.

Referring now to the mobile elements or cradles D, it will be seen that each preferably includes a pair of parallel end plates 8. These end plates 8 are connected by side walls 9 whose upper portions are flared outwardly 10 (at Fig. 4) to appropriately cradle the tire of the implement to be carried. Each unit is also provided with a plurality of axle elements 11 which carry the flanged wheels 4. As will also be seen from Fig. 4 the channel members 1—1 are preferably connected below the line of the flanged wheels 4 by one or more transverse brace members 12 to prevent spreading of the channels under load.

Referring to Figs. 1, 2 and 3, it will be seen that the chassis A is provided at one side with an upstanding guard frame part F, which as shown in Fig. 1, consists of a rest bar 13 supported by upright members 14 and suitably braced by a strut 15. This guard frame F permits the tongue of the implement to be carried to temporarily rest on the top bar 13 until the tongue may be secured by the stabilizing means S and S'.

The stabilizing element S is preferably in the form of a rod or bar 16 whose lower end 17 is appropriately connected or anchored to one of the axle elements C, or the like, while the upper end is arched or bent and also laterally offset from the upper axis of the member 16 so as to cooperate with part 18 of a clamp. The other half 19 of this clamp is carried by the stabilizer S', which, as shown, is in the form of a bar or strap whose lower end is hingedly connected as at 20, to the frame element 13. It will thus be apparent, particularly from Figs. 1 and 3, that when the tongue T is moved upwardly from the frame element 13 to the position shown in Figs. 1 and 2, it may securely hold or clamp the tongue of the implement to render it stable during transportation.

Referring to Fig. 5 it will be seen that the rear ends of the channels 1 may be provided with the stub ramp anchoring elements 21 which may be welded or otherwise secured to the bottom walls 3 of the channels and whose free ends are preferably tapered so as to fit within the open socket ends of the tubular elements 22 which constitute the ramp means R previously referred to. The elements 22 are preferably of the generally angular formation shown and have one end readily receiving the fixed anchors 21 while their free ends will rest upon the ground and provide, in effect, continuation or extensions of the bottom walls 3 of the channels to facilitate the mounting and dismounting of the cradles D.

The front end of the chassis A may be tilted upwardly and held in the desired position by jack or any other convenient type of support, thereby to tilt the rear or loading end of the chassis A toward the surface of the ground. The ramp elements 22 may be placed in position and one of the cradles D may be arranged so as to receive one of the tires or wheels of the implement to be carried. The other opposite wheel of the implement to be carried may have another cradle associated therewith so that it is now possible to move the entire implement up the ramp means so that the flanged wheels of each cradle unit enter the channels and travel on the lower walls 3 thereof.

The tail gate 6 or its equivalent may then be put in place to lock the rear tire cradle against outward shifting. It will, of course, be understood that any number of cradles may be used, depending on the number of wheels on the implement to be carried. Moreover, the flanged wheels like those of the cradles could, on some forms of apparatus, be permanently attached to a frame part so as to always be in position to mount the chassis.

As shown in Fig. 4, the front wall 5 of the chassis may be provided with a loop or eye 5a to threadedly receive a safety chain 5b which in turn may be passed through eyelet 5c on the shank of the hitch B and then connected to the pulling motive powered vehicle as a safety device to comply with the regulations of some states.

In Fig. 6 there is shown a toggle type hitch B' including juxtaposed sections 24, 25, 26. The middle link section 25 has its opposite ends connected to related ends of 24 and 26 by pairs of bolts 28—29. When the sections are alined and both bolts are tight they are in rigid rectilinear alinement. However, when bolts 28 are loosened the center link 25 will pivot about bolts 29 and permit the rear end of the chassis to tilt downwardly while section 24 is still attached to the towing vehicle.

It will thus be seen that the relatively wide agricultural implement may be mounted with facility on the chassis A for transportation on a highway.

I claim:

1. A trailer for transporting wheeled equipment whose width is greater than the traveling lane of a roadway for vehicular travel, including, an elongated chassis having a transverse wheeled axle, said chassis comprising inwardly opening channels forming side rails, a transverse wall permanently connecting the front ends of said side rails, a tail gate at the rear end of the channels removable to provide access thereto, an upright frame on one of the channels and including a horizontal top member constituting a temporary rest for the tongue of the implement to be carried, a clamping bar having its lower end hinged to said horizontal member and its upper end provided with part of a tongue clamp, and a complementary stabilizer member at the other side of the chassis end having its lower end secured thereto, the upper portion of said stabilizer member extending over the chassis, and the terminal portion of said member having a clamping part to mate with the clamping part of the said hinged member for securing the tongue of the implement in a substantially upright position, a plurality of equipment tire receiving units having flanged wheels thereon for tractive engagement with the lower walls of the channels when the tail gate is removed and locked in the channels when the tail gate is in place, and hitch means for connecting the chassis to a towing vehicle.

2. A trailer for transporting wheeled equipment whose width is greater than the traveling lane of a roadway for vehicular travel, including, an elongated chassis having a transverse wheeled axle, said chassis comprising inwardly opening channels forming side rails, a transverse wall permanently connecting the front ends of said side rails, a tail gate at the rear end of the channels removable to provide access thereto, a plurality of equipment tire receiving units having flanged wheels thereon for tractive engagement with the lower walls of the channels when the tail gate is removed and locked in the channels when the tail gate is in place, hitch means for connecting the chassis to a towing vehicle, and ramp means for assisting in mounting the cradles in the channels, said means including tapered elements secured to the channels, and detachable ramp elements each having a socket for receiving said tapered elements to secure them in loading position to receive the wheels of the cradles and direct them into the channels.

3. A trailer for transporting wheeled equipment whose width is greater than the traveling lane of a roadway for vehicular travel, including, in combination, an elongated chassis having a transverse wheeled axle, said chassis comprising inwardly opening channels forming side rails, a transverse wall permanently connecting the front ends of said side rails, a tail gate at the rear end of the channels removable to provide access thereto, a plurality of initially relatively shiftable units having equipment tire receiving cradles whose long dimensions are disposed transversely of the channels, flanged wheels mounted externally of the short dimension of the cradles for tractive engagement with the lower walls of the channels when the tail gate is removed and locked in the channels according to the spacing of the wheels of the equipment to be carried when the tail gate is in place, upstanding means on opposite channels for securing the tongue of an equipment implement in a substantially vertical position to bring the said tongue within the lateral limits of the chassis when the trailer is being towed along a highway, and hitch means for connecting the chassis to a towing vehicle.

4. A trailer according to claim 3, wherein, the hitch means includes juxtaposed overlapping toggle sections connected at their inner ends through a link by bolts in rigid rectilinear relation, said bolts when loosened permitting the toggle sections to break in angular relation and permit the rear end of the chassis to tilt downwards.

5. A trailer according to claim 3, wherein, the cradles comprise front and rear walls disposed in the direction of their long dimension and side walls disposed in the direction of their short dimension and having upwardly inclined tire tread abutting portions.

References Cited in the file of this patent
UNITED STATES PATENTS

| Number | Name | Date |
|---|---|---|
| 2,164,550 | Steward | July 4, 1939 |
| 2,389,338 | Zorc, Jr. | Nov. 20, 1945 |
| 2,496,537 | Huff | Feb. 7, 1950 |
| 2,541,288 | Rice | Feb. 13, 1951 |
| 2,544,456 | Gross | Mar. 6, 1951 |
| 2,600,742 | Drum | June 17, 1952 |
| 2,628,733 | Hale | Feb. 17, 1953 |
| 2,661,856 | Stanley et al. | Dec. 8, 1953 |